July 24, 1951 J. B. ATWOOD 2,561,772

SYSTEM FOR DISTINGUISHING BETWEEN PULSES HAVING DIFFERENT CHARACTERISTICS

Filed Oct. 6, 1944 2 Sheets-Sheet 1

INVENTOR.
JOHN B. ATWOOD
BY H. S. Grover
ATTORNEY

INVENTOR.
JOHN B. ATWOOD
BY H. S. Grover
ATTORNEY

Patented July 24, 1951

2,561,772

UNITED STATES PATENT OFFICE 2,561,772

SYSTEM FOR DISTINGUISHING BETWEEN PULSES HAVING DIFFERENT CHARACTERISTICS

John B. Atwood, Riverhead, N. Y., assignor to Radio Corporation of America, a corporation of Delaware Application October 6, 1944, Serial No. 557,524

16 Claims. (Cl. 250—27)

This invention relates to a method of and apparatus for distinguishing between pulses of different amplitudes and/or different slopes.

The invention, though not limited thereto, finds application in a pulse communication receiver wherein it is desired to discriminate between desired incoming signal pulses and interfering pulses. These interfering pulses may be signals from undesired sources. The invention also is useful in laboratory apparatus where pulse separation on an amplitude or slope basis is desired.

An object of the present invention is to enable the elimination of interfering pulses which are of higher or lower amplitude than the desired pulses.

Another object is to enable the elimination of interfering pulses which have different slopes than the desired pulses.

A further object is to provide apparatus capable of separating pulses of different amplitudes and/or different slopes.

In accordance with the invention, there is provided a circuit arrangement comprising two space discharge paths so arranged that a signal pulse of desired amplitude is permitted to pass through one path and later utilized, while an interfering pulse of greater amplitude is permitted to pass through both paths and then cancelled or bucked out. These two space discharge paths may be in the form of different electron discharge device electrode structures which are normally non-conductive and differently biased so that they become conductive at different input potentials. If the interfering pulse is of smaller amplitude than the desired pulse, the bias is so adjusted that only the desired pulse passes through one path so as to be later utilized, while the interfering pulse is not permitted to pass through either path.

In order to discriminate between desired and undesired pulses having substantially the same amplitude but having different slopes, the invention makes use of a plurality of differentiator circuits and other elements for converting the pulses of different slopes to pulses of different amplitudes. After the pulses have been given different amplitudes, they are separated by suitably adjusting the biases on the electron discharge devices of the system.

Figure 1:
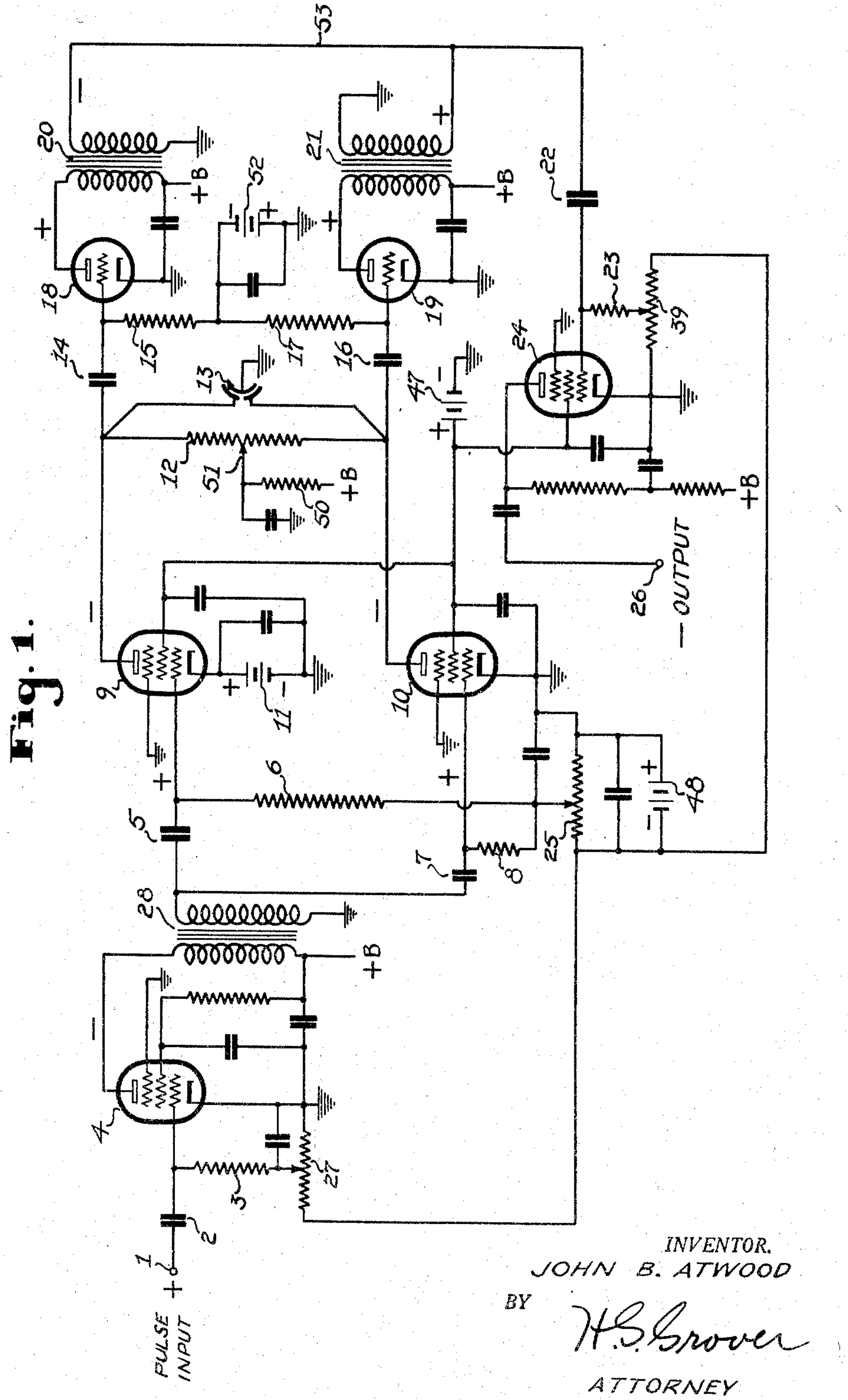
Figure 2:
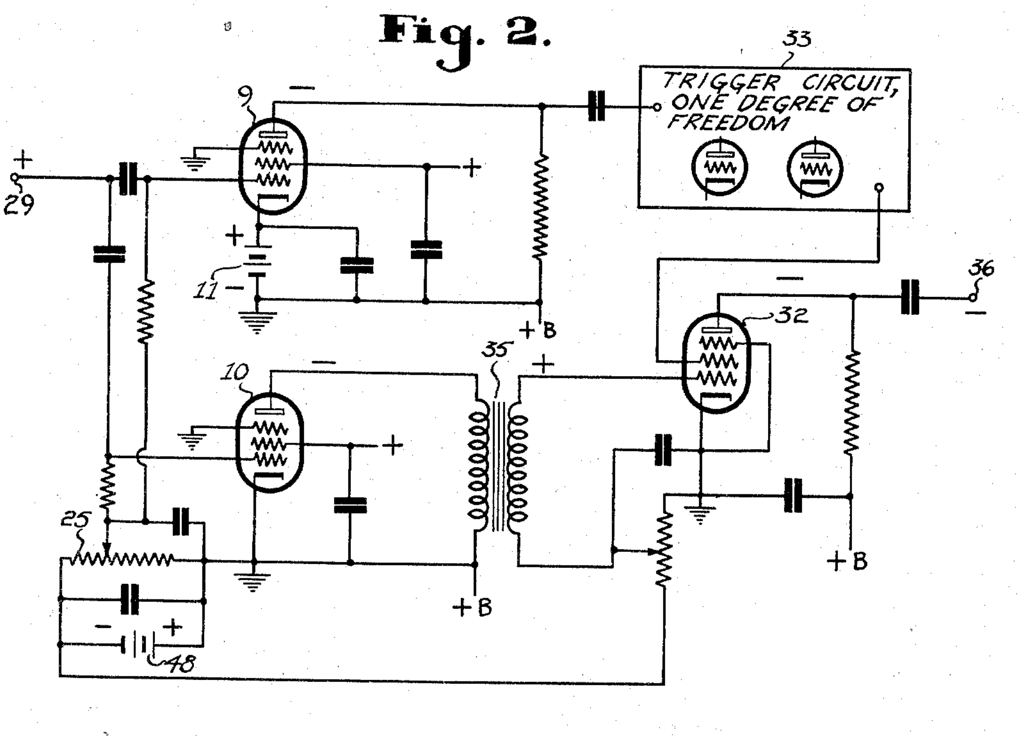
Figure 3:
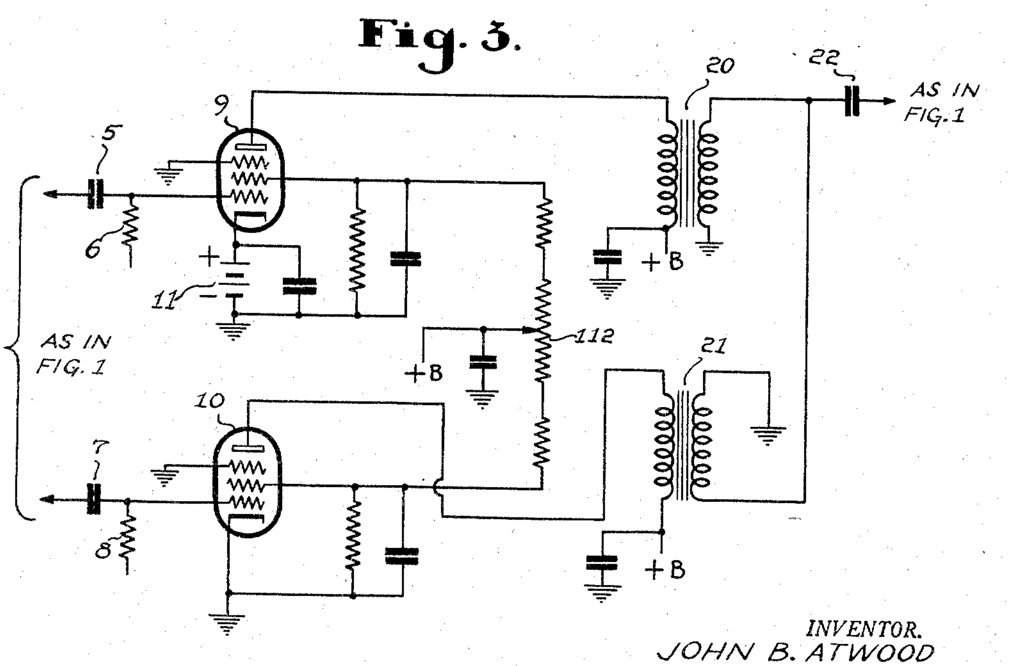

A more detailed description of the invention follows in conjunction with a drawing, wherein:

Figs. 1, 2 and 3 illustrate three different embodiments of the invention for separating pulses on an amplitude and/or slope basis.

Referring to Fig. 1, there is shown an input terminal 1 to which both the desired signal pulses and undesired pulses are supplied, and an output terminal 26 from which only the desired signals are obtained. Between terminals 1 and 26 there are provided evacuated electron discharge devices 4, 9, 10, 18, 19, and 24 with associated circuit elements for separating the desired from the undesired pulses. Terminal 1 may be connected to a receiver (not shown) or any other suitable source which supplies pulses of positive polarity of different amplitudes and/or different slopes to this terminal. Vacuum tube 4 serves to amplify the pulses applied to terminal 1 and to invert the polarity of the applied pulses from a positive to a negative sign. The control grid of tube 4 is connected through a resistance 3 to a potentiometer 27, which serves to supply an adjustable bias to the control grid of the tube. Output pulses of negative polarity are taken from the anode of vacuum tube 4 and pass through the primary winding of an iron core pulse transformer 28. This transformer inverts the polarity of the negative pulses appearing in the primary winding and supplies positive pulses to the control grids of screen grid vacuum tubes 9 and 10 which are connected in electrically parallel relaton to the secondary winding of transformer 28 through condensers 5 and 7, respectively. The control grids of tubes 9 and 10 obtain a bias through resistors 6 and 8, respectively, from a potentiometer 25 across whose terminals there is connected a common bias battery 48. Tubes 9 and 10 are preferably of a sharp cut-off type and are differentially biased by means of battery 11 in the cathode circuit of tube 9. It should be understood that battery 11 shows only one way of obtaining a differential bias and that the invention is not limited to this circuit detail since, if desired, a differential bias may be obtaned, for example, by directly grounding the cathode of tube 9 and obtaining a grid bias for this tube through resistor 6 from another potentiometer which can be connected across battery 48.

The anodes of tubes 9 and 10 are connected to opposite terminals of a potentiometer 12 which has a suitable positive polarizing potential connected to a point intermediate its length through resistor 50 and a variable tap 51. The potentiometer 12 thus permits the gain of the two tubes 9 and 10 to be differentially adjusted by providing different anode loads for the tubes. The condenser 13 positioned across the terminals of potentiometer 12 is arranged so as to equalize the phase shift between the two sides of the circuit. In effect, this condenser enables the time constants of the anode circuits of the tubes 9 and 10 to be the same, irrespective of the values of the individual resistor loads on the anode circuits when the tap 51 is off the center of the potentiometer 12. Once the potentiometer 12 and condenser 13 are adjusted, this adjustment will hold for a large range of amplitude of the interfering pulses. The best adjustment is slightly different for very high amplitudes than for lower amplitude pulses. Output from tubes 9 and 10 is in the form of negative pulses.

Negative pulses from the anodes of tubes 9 and 10 are applied to the grids of triode vacuum tube amplifiers 18 and 19 (operating class A) through condensers 14 and 16, respectively. The grids of tubes 18 and 19 are connected through resistors 15 and 17, respectively, to the negative terminal of a bias battery 52. This battery is shunted by a by-pass condenser, as shown. Condenser 14 and resistor 15 form a differentiator circuit. Condenser 16 and resistor 17 also form a differentiator circuit. The tubes 18 and 19 serve to invert the polarity of the pulses applied to their grids and supply positive pulses from their anodes to the primaries of the pulse transformers 20 and 21. The secondary of transformer 20 is connected so as to produce negative pulses in lead 53, while the secondary of transformer 21 is reversed relative to that of transformer 20 so as to produce positive pulses in the same lead. The secondaries of transformers 20 and 21 are connected together through lead 53 and the resultant voltage appearing therein applied through condenser 22 to the control grid of the output screen grid vacuum tube 24. The output of tube 24 appears as negative pulses at terminal 26.

In the operation of the system of Fig. 1, for separating desired from undesired pulses, the differential bias of battery 11 is preferably made to be nearly equal to the anode current cut-off bias of tube 9. The common bias through potentiometer 25 is made to be large enough to maintain tubes 9 and 10 well below the anode current cut-off condition, the exact value of this common bias depending upon the amplitude of the pulses applied to the grids of these tubes. From an inspection of the drawing it will be evident that the tube 9 is given a greater bias than the tube 10 so that there is required a pulse of greater magnitude to be applied to tube 9 in order to pass through this tube than through tube 10. In order to discriminate between pulses of different amplitudes, the circuit adjustments are so made that the desired signal pulse is permitted to pass through only one side of the circuit; namely only through tube 10 and not through tube 9. Pulses of greater magnitude than a desired pulse, such as interfering pulses, will pass through both sides of the circuit; namely through both tubes 9 and 10, and will cancel or be bucked out in the outputs of transformers 20 and 21. Interfering pulses of smaller magnitude than that of the desired signal pulse will not pass through either tube 9 or 10.

Let us assume first that a single positive pulse of low amplitude is applied to the grids of tubes 9 and 10 through tube 4 and this pulse is insufficient to overcome the negative bias on the grids of tubes 9 and 10. Due to the greater negative bias supplied from potentiometer 25, it will be seen that there will be no output pulse in the anode circuit of either tube 9 or 10. Now if this single positive pulse of low amplitude in the input circuits of tubes 9 and 10 is gradually increased in amplitude, a point will be reached where a pulse will appear in the output of tube 10 but not in the output of tube 9, due to the differential bias supplied by battery 11. This pulse which appears in the output of tube 10 will pass through tubes 19 and 24 and appear in output terminal 26. If, however, the amplitude of the pulse applied to the grids of tubes 9 and 10 is increased still further, to a magnitude sufficient to overcome the negative bias of tube 9, a pulse will appear in the outputs of both tubes 9 and 10 and the secondaries of transformers 20 and 21. Under this condition, if the gain through the two sides of the circuit composed of tubes 9 and 10 is adjusted by potentiometer 12 and the phase shift adjusted by condenser 13, then pulses in the secondary windings of transformers 20 and 21 will cancel or buck each other and nothing will appear in the output of tube 24. This adjustment will not affect the operation of the system at lower amplitudes.

Condenser-resistor circuits 5, 6, and 7, 8 in the inputs of tubes 9 and 10 are differentiator circuits. Condenser-resistor circuits 14, 15 and 16, 17 in the outputs of tubes 18 and 19 are also differentiator circuits. These differentiating circuits are given short time constants and aid in separating pulses of substantially equal amplitudes and of different slopes. It is known in the art that the voltage appearing across the resistor of an R.-C. differentiating circuit is proportional to the slope of an applied voltage pulse. The leading edge of this applied voltage pulse can be represented at least to a first approximation by the expression: Voltage $e=kt$, where $k$ is the slope, and $t$ the time. This principle is utilized in the present invention to separate pulses of different slopes.

In a system wherein it is desired to separate pulses on an amplitude and slope basis, the following seven conditions may be encountered. Under each one of these conditions, a description is given of the way the pulses can be separated or distinguished in the system of Fig. 1. In the following description the undesired interfering pulse is represented by the letter U, while the desired or signal pulse is represented by the letter S.

1. U is higher in amplitude than S and of the same slope at the grids of tubes 9 and 10. U will pass through both tubes 9 and 10 and be cancelled or bucked out in the outputs of transformers 20 and 21. S will pass through tube 10 only and will be amplified in tubes 19 and 24 and appear at output terminal 26.

2. U is lower in amplitude than S and of the same slope at the grids of tubes 9 and 10. U cannot go through either tube 9 or 10 because its amplitude is insufficient to overcome the common bias potential supplied by potentiometer 25. S will pass through tube 10 and will be amplified in tubes 19 and 24 and will appear at output terminal 26.

3. U and S are the same or almost the same in amplitude and of the same slope at the grids of tubes 9 and 10. In this condition, it is impossible to eliminate U within a small range of voltages. This small percentage range of voltages in which U and S cannot be separated can be reduced by amplifying the voltages of U and S before their application to tubes 9 and 10, and then increasing the bias applied by potentiometer 25, so as to distinguish between the different pulses applied to tubes 9 and 10 in a manner described above in connection with the above conditions 1 and 2. It should be understood that although the actual voltage range is constant, the percentage range (of applied voltage) is reduced with increased amplitude.

4. U and S are of the same amplitude but S is steeper in slope at the grid of tube 4. By virtue of the differentiating action of the transformer 28 and circuits 5, 6 and 7, 8, the amplitude of S will be higher than that of U on the grids of tubes 9 and 10. By adjusting potentiometer 25, it is possible to prevent U from passing through either tube 9 or 10, in the manner described above in connection with condition 2, while permitting S to pass through tube 10.

5. U and S are of the same amplitude but U is steeper in slope at the grid of tube 4. U will now have a greater amplitude on the grids of tubes 9 and 10 than S, due to the differentiating action of the transformer 28 and circuits 5, 6 and 7, 8. It is now possible to cause U to pass through both tubes 9 and 10 so that the outputs of transformers 20 and 21 cancel and buck each other, while S passes only through tube 10 and tubes 19 and 24 and appears at the output terminal 26. The adjustment of potentiometer 25 enables a suitable adjustment in the bias of the two tubes 9 and 10 so that this condition can be fulfilled. It should be noted at this time that subsequent to the differentiating action the separation of the pulses follows substantially condition 1.

6. U is of lower amplitude than S but of steeper slope at the grid of tube 4. By adjusting the grid bias of the tube 4 by means of potentiometer 27, it is possible to eliminate U and prevent it from passing through tube 4. If this were not done, U and S might appear on the grids of tubes 9 and 10 as pulses of the same amplitude, which is a condition it is desired to avoid.

7. S is of lower amplitude than U but of steeper slope at the grid of tube 4. The amplitude of S will be raised with respect to U by virtue of the differentiating action of the transformer 28 and the circuits of 5, 6, and 7, 8. Potentiometer 25 is now adjusted so as to permit U and S to pass only through the tube 10. Due to the differentiating action of condenser 16, resistor 17, and transformer 21, the amplitude of the steeper sloped pulse S will now be higher than the amplitude of U in the output of transformer 21. By adjusting the bias on potentiometer 39 in the input circuit of tube 24, it is now possible to remove or prevent U from passing the tube 24 while permitting S to pass through this tube.

Another embodiment of the system is shown in Fig. 2 which operates on a slightly different principle from Fig. 1. Tubes 9 and 10 of Fig. 2 are similar to tubes 9 and 10 of Fig. 1. Potentiometer 25 and its battery 48 supplies a common bias to the control grids of tubes 9 and 10. Battery 11 in the cathode circuit of tube 9 furnishes the differential bias. Positive pulses are applied to the input terminal 29. It should be noted that in Fig. 2 the differentiating circuits of Fig. 1 are omitted. The output of tube 9 is supplied to a trigger circuit 33 having one degree of electrical stability. More specifically, the trigger circuit may be of any well known type, preferably a system having two vacuum tube electrode structures whose anodes and grids are resistively interconnected in a regenerative fashion. This trigger circuit, by virtue of a difference in bias applied to the grids of its two electrode structures, is of a self-restoring type so that it has only one degree of freedom. The output of the trigger circuit 33 is connected to the screen grid of pentode vacuum tube 32 whose control grid is coupled to the output of tube 10 through pulse transformer 35. Tube 32 is normally biased to cut-off and requires a positive pulse from the secondary winding of transformer 35 in order for it to pass current. Terminal 36 is the output terminal in which appear the desired signal pulses but not the interfering or noise pulses.

Before describing the operation of Fig. 2, it should be noted that the positive input pulses applied to input terminal 29 are inverted in polarity by the tubes 9 and 10 so as to appear as negative pulses on the anodes of these tubes. Pulse transformer 35 inverts the negative pulse supplied to its primary winding and thus supplies a positive pulse from its secondary winding to the control grid of pentode 32, of a magnitude sufficient to overcome the normal bias on the control grid and cause tube 32 to pass current. Tube 32 supplies a negative pulse to the output terminal 36. Trigger circuit 33 serves to remove the screen voltage from tube 32 and thus prevents the passage of current through this tube whenever the trigger fires.

In the operation of Fig. 2, let us assume that low amplitude interfering pulses are supplied to input terminal 29 of positive polarity but of insufficient magnitude to overcome the bias supplied to tubes 9 and 10 by potentiometer 25. Under this condition, these low amplitude noise pulses will not affect either tube 9 or 10 and not be passed thereby. As the amplitude of the positive input pulse is raised, a point will be reached where vacuum tube 10 will pass the pulse but tube 9 will not pass the pulse, by virtue of the differential bias supplied by battery 11. The passage of a pulsee through tube 10 will cause a positive pulse to appear on the control grid of tube 32, as a result of which a negative pulse will appear at the output terminal 36. However, if higher amplitude positive pulses appear at the input terminal 29, of a magnitude sufficient to overcome the bias supplied by potentiometer 25 and battery 11, these pulses will pass through both tubes 9 and 10 and appear as negative pulses in the anode circuits of these two tubes. The negative pulse appearing in the output of tube 9 will fire or render active the trigger circuit 33 which is of the self-restoring type having only one degree of electrical stability. The operation of trigger circuit 33 from its stable to its active state in response to the negative input pulse from tube 9 will remove the screen grid voltage from tube 32 and thus prevent tube 32 from passing current. Under this condition, the pulse passed by tube 9 will not appear at the output terminal 36.

A disadvantage of Fig. 2 as compared to Fig. 1 lies in the fact that the system of Fig. 2 is not selective to pulses of different slopes. Further, trigger circuit 33 should be so adjusted that in the presence of interfering pulses of a high pulse rate, this trigger circuit should be able to restore itself to normal; otherwise the desired signal pulse passing through tube 10 will not appear at the output terminal 36.

Fig. 3 shows another embodiment of the present invention which is similar to the system of Fig. 1, except for the elimination of tubes 18 and 19 and differentiator circuits 14, 15 and 16, 17. Fig. 3 is a simplification of the system of Fig. 1. The same elements appearing in Fig. 3 which appear in Fig. 1 have been given the same reference numerals. In order to simplify the drawing, and overcome duplication of illustration, the transformer 28 and vacuum tube 4 to the left of condensers 5 and 7, and vacuum tube 24 which follows the condenser 22, have not been shown in Fig. 3, although it should be understood that these elements of Fig. 1 are connected to Fig. 3 in the same manner illustrated in Fig. 1.

The potentiometer 12 of Fig. 1 has been replaced by potentiometer 112 in Fig. 3. This potentiometer 112 in Fig. 3 varies the screen voltages of tubes 9 and 10 in order to adjust the gains of the two sides of the circuit. The secondary windings of transformers 20 and 21 in Fig. 3 are reversed relative to the equivalent connections in Fig. 1, in order to obtain pulses of proper polarity to be applied to the tube 24.

A disadvantage of Fig. 3 which is overcome by Fig. 1 is that it is not possible to separate the undesired pulse from the desired pulse for all slope conditions. For example, the system of Fig. 3 cannot separate pulses discussed in condition 7 above, where S is of lower amplitude than U, but is of steeper slope at the grid of tube 4.

What is claimed is:

1. The method of separating pulses of different slopes and of substantially the same amplitude which includes the steps of converting these pulses to pulses of different amplitudes, applying the pulses of different amplitudes to a pair of paths, enabling pulses of a predetermined amplitude to pass through only one of said paths, preventing pulses of smaller amplitude from passing through either path, enabling pulses of larger amplitude to pass through both of said paths, and cancelling those pulses of larger amplitude after they have passed through both of said paths.

2. The method of separating pulses of substantially the same amplitude and of different slopes which includes the steps of differentiating these pulses to produce pulses of the same polarity but of different amplitudes, applying said pulses of different amplitudes to a pair of differentially biased space discharge paths, adjusting the biases of said paths so that pulses of a desired amplitude pass only through the path having the smaller bias, while pulses whose amplitude is smaller than said desired amplitude cannot pass through either path and pulses of larger amplitude pass through both of said paths, and cancelling those pulses of larger amplitude after they have passed through both of said paths.

3. A system for separating pulses having different characteristics comprising a pair of vacuum tube electrode structures, each having an input electrode and an output electrode, one or more sources of unidirectional potential coupled to said input electrodes for biasing the input electrodes to a relatively different degree, a circuit for supplying said pulses to said input electrodes in cophasal relation, said circuit including a pulse differentiator for each of said input electrodes, individual transformers coupled to the output electrodes of said structures, and a utilization circuit coupled in parallel to the output windings of said transformers, said transformers being so poled as to produce pulses of opposite polarities in their output windings.

4. A system for separating pulses having different characteristics comprising a pair of vacuum tube electrode structures, each having an input electrode and an output electrode, one or more sources of unidirectional potential coupled to said input electrodes for biasing the input electrodes to a relatively different degree, a circuit for supplying said pulses to said input electrodes in cophasal relation, said circuit including a pulse differentiator for each of said input electrodes, individual transformers having their primary windings coupled to the output electrodes of said structures, and a utilization circuit coupled in parallel to the secondary windings of said transformers, said transformers being so poled as to produce pulses of opposite polarities in their secondary windings, and a pulse differentiator circuit between the primary winding of each transformer and the output electrode of its associated vacuum tube electrode structure.

5. A system for separating pulses having different characteristics comprising a pair of vacuum tube electrode structures, each having an input electrode and an output electrode, one or more sources of unidirectional potential coupled to said input electrodes for biasing the input electrodes to a relatively different degree, a circuit for supplying said pulses to said input electrodes in cophasal relation, a potentiometer for varying the relative gains of said pair of electrode structures, individual transformers coupled to the output electrodes of said structures, and a utilization circuit coupled in parallel to the output windings of said transformers, said transformers being so poled as to produce pulses of opposite polarities in their output windings.

6. A system for separating pulses having different characteristics comprising a pair of vacuum tube electrode structures, each having an input electrode and an output electrode, one or more sources of unidirectional potential coupled to said input electrodes for biasing the input electrodes to a relatively different degree, a circuit for supplying said pulses to said input electrodes in cophasal relation, a potentiometer across the output electrodes of said pair of electrode structures, said potentiometer having a variable tap supplying polarizing potentials to said output electrodes, and a variable condenser across said potentiometer for equalizing the time constants of the output circuits of said pair of electrode structures, individual transformers having their input windings coupled to the output electrodes of said structures through another pair of electrode structures, and a utilization circuit coupled in parallel to the output windings of said transformers, said transformers being so poled as to produce pulses of opposite polarities in their output windings.

7. A system for separating pulses having different characteristics comprising a pair of vacuum tubes each having a grid, a cathode and an anode, an electrical connection between said grids for coupling said grids in parallel relation, an iron core transformer having a primary winding coupled to a source of said pulses and a secondary winding coupled to said electrical connection for supplying pulses in cophasal relation to said grids, one or more sources of potential for differentially biasing said grids, individual transformers having their primary windings coupled through individual differentiator circuits to the anodes of said tubes, said last transformers being so poled as to produce pulses of opposite polarities in their secondary windings, a utilization circuit coupled in parallel relation to said secondary windings, a potentiometer connected across said anodes, and means in circuit with said potentiometer for equalizing the phase shifts of energy passing through said tubes.

8. A system for separating pulses having different characteristics comprising a pair of vacuum tube electrode structures, each having an input electrode, a screen grid and an output electrode, one or more sources of unidirectional potential coupled to said grids for biasing the grids to a relatively different degree, a circuit for supplying said pulses to said input electrodes in cophasal relation, a potentiometer across said screen grids for adjusting the relative gains of said pair of electrode structures, individual transformers having their input windings coupled to the output electrodes of said structures, and a utilization circuit coupled in parallel to the output windings of said transformers, said transformers being so poled as to produce pulses of opposite polarities in their output windings.

9. A system for distinguishing between pulses having different characteristics, comprising a pair of vacuum tube electrode structures each having an input circuit and an output circuit, means for biasing said input circuits differently, means for applying said pulses to both of said input circuits in electrically parallel relation, a utilization circuit coupled to the output circuit of that one electrode structure which has the smaller bias applied to its input circuit, and means responsive to pulses of a magnitude sufficient to pass through both electrode structures for effectively interrupting the coupling path from said utilization circuit to the output circuit of said one electrode structure.

10. A system for distinguishing between pulses having different characteristics, comprising a pair of vacuum tube electrode structures each having an input circuit and an output circuit, means for biasing said input circuits differently, means for applying said pulses to both of said input circuits in electrically parallel relation, a utilization circuit coupled to the output circuits of that one electrode structure which has the smaller bias applied to its input circuit, and means responsive to pulses of a magnitude sufficient to pass through both electrode structures for effectively interrupting the coupling path from said utilization circuit to the output circuit of said one electrode structure, said means including a self-restoring electron discharge device trigger circuit coupled to the output circuit of that electrode structure which has the larger bias applied to its input circuit.

11. A system for separating pulses having different characteristics comprising a pair of screen grid vacuum tubes each having a grid, a cathode and an anode, an electrical connection between said grids for coupling said grids in parallel relation, an iron core transformer having a primary winding coupled to a source of said pulses and a secondary winding coupled to said electrical connection for supplying pulses in cophasal relation to said grids, one or more sources of potential for differentially biasing said grids, a second pair of vacuum tubes having their inputs coupled to the anodes of said first pair of tubes, a differentiator circuit for the input of each tube of said second pair, individual transformers having their primary windings coupled to the outputs of said second pair of tubes, said last transformers being so poled as to produce pulses of opposite polarities in their secondary windings, and a utilization circuit coupled in parallel relation to said secondary windings.

12. A system for separating pulses having different characteristics comprising a pair of vacuum tube electrode structures, each having an input electrode and an output electrode, one or more sources of unidirectional potential coupled to said input electrodes for biasing the input electrodes to a relatively different degree, a circuit for supplying said pulses to said input electrodes in cophasal relation, a potentiometer for varying the relative gains of said pair of electrode structures, individual transformers coupled to the output electrodes of said structures through another pair of vacuum tube electrode structures, and a utilization circuit coupled in parallel to the output windings of said transformers, said transformers being so poled as to produce pulses of opposite polarities in their output windings.

13. A circuit for discriminating between received pulses of voltage in accordance with a characteristic thereof comprising, an electron discharge device having current flow therein determined by the application of voltages thereto, a first differentiator circuit for differentiating received voltages pulses, a second differentiator circuit for differentiating received voltage pulses, means including a phase shifting circuit, different paths from said differentiator circuits to terminals on said phase shifting circuit which are on opposite sides of the electrical center of the phase shifting circuit, and two branches coupled to said terminals and producing voltage pulses of opposite polarities in response to current flow therein, and connections from the output terminals of said branches to said electron discharge device, whereby the flow of current in said device is determined by the voltage pulse in the output of at least one of said branches and the occurrence time of the pulses in the outputs of both branches.

14. The method of separating a desired pulse from an undesired pulse when the desired pulse is of lower amplitude but of steeper slope than the undesired pulse, which comprises differentiating said pulses so as to raise the amplitude of the desired pulse with respect to the undesired pulse, passing said differentiated pulses through a space discharge path, and increasing the amplitude of that differentiated pulse representative of the desired pulse by a further differentiation process, whereby the desired pulse now has an amplitude higher than the undesired pulse.

15. The method of separating a desired pulse from an undesired pulse when the desired pulse is of lower amplitude but of steeper slope than the undesired pulse, which comprises differentiating said pulses so as to raise the amplitude of the desired pulse with respect to the undesired pulse, passing said differentiated pulses through a space discharge path, increasing the amplitude of that differentiated pulse representative of the desired pulse by a further differentiation process, whereby the desired pulse now has an amplitude higher than the undesired pulse, and passing only the resulting higher amplitude desired pulse through another space discharge path.

16. The method of separating pulses of different slopes and of substantially the same amplitude which includes the steps of converting these pulses to pulses of different amplitudes, applying the pulses of different amplitudes to a pair of paths, enabling pulses of a predetermined amplitude to pass through only one of said paths, preventing pulses of smaller amplitude from passing through either path, enabling pulses of larger amplitude to pass through both of said paths, but reversing the polarity of the pulse passing through one of said paths relative to that passing through the other path, and combining said pulses of reversed polarities after they have passed through both of said paths.

JOHN B. ATWOOD.

(References on following page)

REFERENCES CITED

The following references are of record in the file of this patent:

UNITED STATES PATENTS

| Number | Name | Date |
|---|---|---|
| 1,481,284 | Deardorff | Jan. 22, 1924 |
| 2,208,349 | Ulbricht | July 16, 1940 |
| 2,236,015 | Sonnentag et al. | Mar. 25, 1941 |
| 2,251,973 | Beale et al. | Aug. 12, 1941 |
| 2,266,401 | Reeves | Dec. 16, 1941 |
| 2,344,745 | Somers | Mar. 21, 1944 |
| 2,355,363 | Christaldi | Aug. 8, 1944 |
| 2,434,921 | Grieg | Nov. 2, 1944 |
| 2,434,937 | Labin | Jan. 27, 1948 |

FOREIGN PATENTS

| Number | Country | Date |
|---|---|---|
| 528,192 | Great Britain | Oct. 14, 1940 |